US006772098B1

(12) United States Patent
Stark et al.

(10) Patent No.: US 6,772,098 B1
(45) Date of Patent: Aug. 3, 2004

(54) SYSTEMS AND METHODS FOR MANAGING INSPECTIONS

(75) Inventors: Randal Raymond Stark, Morgan Hill, CA (US); Sampath Ranganath, San Jose, CA (US); Ahdee Quan Chan, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,030

(22) Filed: Jul. 11, 2001

(51) Int. Cl.[7] .............................................. G06F 11/00
(52) U.S. Cl. ........................... 702/188; 702/33; 702/34; 702/182; 702/183; 702/188
(58) Field of Search ................................ 702/182, 183, 702/184, 185, 188; 700/9; 376/216, 217

(56) References Cited

U.S. PATENT DOCUMENTS

| 4,642,215 | A | * | 2/1987 | Klinvex et al. ............. 376/249 |
| 4,998,208 | A | * | 3/1991 | Buhrow et al. ............... 702/35 |
| 5,321,629 | A | * | 6/1994 | Shirata et al. .............. 702/187 |
| 5,428,547 | A | * | 6/1995 | Ikeda ......................... 700/174 |
| 5,657,245 | A | * | 8/1997 | Hecht et al. ................. 700/287 |
| 5,724,261 | A | * | 3/1998 | Denny et al. ................ 702/184 |
| 5,817,958 | A | * | 10/1998 | Uchida et al. ............. 73/865.9 |
| 5,826,252 | A |   | 10/1998 | Wolters, Jr. et al. |
| 5,856,931 | A | * | 1/1999 | McCasland ................. 702/182 |
| 5,918,191 | A |   | 6/1999 | Patel |
| 5,987,474 | A |   | 11/1999 | Sandifer |
| 6,167,394 | A |   | 12/2000 | Leung et al. |
| 6,263,265 | B1 |  | 7/2001 | Fera |
| 6,487,518 | B1 | * | 11/2002 | Miyazaki et al. ........... 702/170 |
| 2001/0053940 | A1 | * | 12/2001 | Horn et al. .................... 700/32 |
| 2001/0056335 | A1 | * | 12/2001 | Ikeda et al. ................. 702/188 |
| 2002/0029222 | A1 | * | 3/2002 | KEY .......................... 707/102 |
| 2002/0123864 | A1 | * | 9/2002 | Eryurek et al. ............. 702/188 |

FOREIGN PATENT DOCUMENTS

| JP | 07280978 A | * | 10/1995 | ............ G21C/7/12 |
| JP | 10222543 A | * | 8/1998 | ........... G06F/17/40 |
| JP | 11154011 A | * | 6/1999 | ........... G05B/23/02 |
| JP | 11345019 A | * | 12/1999 | ........... G05B/23/02 |
| JP | 2002023842 A | * | 1/2002 | ........... G05B/23/02 |
| WO | WO 00 08577 A |   | 2/2000 |   |
| WO | WO 01 41024 A |   | 6/2001 |   |

OTHER PUBLICATIONS

Energy Information Administration, "State–by–State list of U.S. Operating Nuclear Reactors". 2000.*
U.S. patent application No. 09/634,434, filed on Aug. 8, 2000.
European Search Report, 29.7.03, pp. 1–3.

* cited by examiner

Primary Examiner—Marc Hoff
Assistant Examiner—Jeffrey R. West
(74) Attorney, Agent, or Firm—Armstrong Teasdale LLP

(57) ABSTRACT

A method is provided for managing inspection requirements using a network-based system. The system includes a server system coupled to a centralized database and at least one client system. The method includes receiving information relating to a plurality of components of a specific plant and storing the information into a centralized database. The method further includes cross-referencing the information received, updating the centralized database based on the information received and providing information in response to an inquiry.

30 Claims, 9 Drawing Sheets

| WELD | DESCRIPTION | EXAM TYPE | LAST INSPECTION | CRITERIA MET? | INDICATIONS | COMMENTS |
|---|---|---|---|---|---|---|
| COMPONENT CR GUIDE TUBE | | | | | | |
| CRGT-2, G-08 | CRD GUIDE TUBE BODY-TO- SLEEVE WELD | VT-3/4 | AUG 1995 | Y | N | DETAILS |
| CRGT-2, H-07 | CRD GUIDE TUBE BODY-TO- SLEEVE WELD | VT-3/4 | AUG 1995 | Y | N | DETAILS |
| CRGT-3, F-08 | CRD GUIDE TUBE BODY-TO- BODY WELD | VT-3/4 | AUG 1995 | Y | N | DETAILS |
| CRGT-3, G-06 | CRD GUIDE TUBE BODY-TO- BODY WELD | VT-3/4 | AUG 1995 | Y | N | DETAILS |
| CRGT-3, G-07 | CRD GUIDE TUBE BODY-TO- BODY WELD | VT-3/4 | AUG 1995 | Y | N | DETAILS |
| CRGT-3, G-08 | CRD GUIDE TUBE BODY-TO- BODY WELD | VT-3/4 | AUG 1995 | Y | N | DETAILS |
| CRGT-3, H-06 | CRD GUIDE TUBE BODY-TO- BODY WELD | VT-3/4 | AUG 1995 | Y | N | DETAILS |
| CRGT-3, H-07 | CRD GUIDE TUBE BODY-TO- BODY WELD | VT-3/4 | AUG 1995 | Y | N | DETAILS |
| CRGT-3, H-08 | CRD GUIDE TUBE BODY-TO- BODY WELD | VT-3/4 | AUG 1995 | Y | N | DETAILS |
| CRGT-3, H-09 | CRD GUIDE TUBE BODY-TO- BODY WELD | VT-3/4 | AUG 1995 | Y | N | DETAILS |
| CRGT-3, J-07 | CRD GUIDE TUBE BODY-TO- BODY WELD | VT-3/4 | AUG 1995 | Y | N | DETAILS |
| CRGT-3, J-08 | CRD GUIDE TUBE BODY-TO- BODY WELD | VT-3/4 | AUG 1995 | Y | N | DETAILS |

EXAMINED APPROXIMATELY 50% OF CIRCUMFERENCE (EAST SIDE) DUE TO INTERFERENCES

FIG. 8

HISTORICAL EXAM — 600
MIDWEST ROG — 610
DRESDEN 2 — 602
LAST INSPECTION RANGE: JAN ▽ 1990 ▽ JAN ▽ 2010 ▽ (612, 614, 616)
COMPONENTS: ALL ▽ — 620
CRITERIA MET?: ALL ▽ — 622
INDICATIONS: ALL ▽ — 624
606

OK    BACK

JAN 05, 2001 — 604

- ALL — 628
- CORE SPRAY — 630
- CP STIFFENER BEAMS — 632
- CONTROL ROD DRIVE HOUSING — 634
- CONTROL ROD GUIDE TUBES — 636
- PIPE BRACKET — 638
- CORE SPRAY SPARGER — 640
- FEED WATER SPARGER — 642
- INCORE HOUSING — 644
- INCORE GUIDE TUBE — 646
- SRM/IRM — 648
- JET PUMP — 650
- MOISTURE SEPARATOR — 652
- RPV INTERIOR — 654
- SHROUD — 656
- CDR STUB TUBE — 658
- STEAM DRYER — 660
- TG ALIGN PIN — 662

FIG. 9

COMPONENT: CORE SPRAY

| WELD | DESCRIPTION | EXAM TYPE | LAST INSPECTION | CRITERIA MET? | INDICATIONS | NEXT REQUIRED EXAM | COMMENTS |
|---|---|---|---|---|---|---|---|
| 1P3 | HORIZONTAL PIPE TO JUNCTION BOX LOOP A @ 5° AZIMUTH | UT | MAR-1999 | Y | N | MAR-2002 | DETAILS |
| 1P4A | HORIZONTAL PIPE TO ELBOW LOOP A @ 5° AZIMUTH ELBOW TO PIPE | UT | MAR-1998 | Y | N | MAR-2006 | DETAILS |
| 1P4B | DOWNCOMER LOOP A @ 80° DOWNCOMER | UT | MAR-1998 | Y | N | MAR-2006 | DETAILS |
| 1P4C | LOWER DOWNCOMER TO ELBOW WELD LOOP A @ 80° AZIMUTH | UT | MAR-1998 | Y | N | MAR-2006 | DETAILS |
| 1P4D | LOWER ELBOW TO SHROUD PIPE WELD LOOP A @ 80° AZIMUTH | EVT-1 | OCT-1999 | Y | N | OCT-2007 | DETAILS |
| 1P5 | SLIDING SLEEVE TO UPPER DOWNCOMER LOOP A @ 80° DOWNCOMER | EVT-1 | MAR-1998 | Y | N | MAR-2000 | DETAILS |
| 1P6 | SLIDING SLEEVE WELD TO OUTER SLEEVE LOOP A @ 80° DOWNCOMER | UT | MAR-1998 | Y | N | MAR-2002 | DETAILS |
| 1P7 | OUTER SLEEVE TO LOWER DOWNCOMER WELD LOOP A @ 80° DOWNCOMER | UT | MAR-1998 | Y | N | MAR-2002 | DETAILS |
| 1P8A | COLLAR WELD TO SHROUD PIPE LOOP A @ 80° DOWNCOMER | EVT-1 | OCT-1999 | Y | N | OCT-2001 | DETAILS |

UT OF CREVICED OF TEE-BOX TO PIPE WELD WITH NO INDIATIONS (BWRVIP-18)

FIG. 10

SYSTEMS AND METHODS FOR MANAGING INSPECTIONS

COPYRIGHT STATEMENT

A portion of the disclosure of this patent document contains material that is subject to copyright protection. The copyright owner has no objection to the facsimile reproduction by anyone of the patent document or the patent disclosure, as It appears In the Patent and Trademark Office patent file or records, but otherwise reserves all copyright rights whatsoever.

BACKGROUND OF INVENTION

This invention relates generally to management of inspections and, more particularly, to network-based systems and methods for management of plant specific material inspections using a database.

Inspections are a serious issue particularly in a government regulated industry such as nuclear power electricity production or aircraft maintenance. These industries are obligated to maintain strict compliance relating to product performance and safety. For a business entity Involved in a regulated industry such as nuclear power, transportation, or aircraft maintenance, the on-going inspection of key components, such as structural welds, is important to maintain the overall functionality of the system. In such industries, documentation relating to the material inspection regulations of various components is typically supplied to users through a combination of hard-copy files separately maintained by individual managers and/or a service department. Additionally, inspection can vary in complexity or detail. Notifications of inspections, either routine or emergency, are generally made by personal contact or through individual reports. Moreover, various inspections may conflict, requiring access to the same physical location to perform inspections on different components or welds. Events also occur that can warrant prompt attention and which can require modification of pre-planned inspection schedules. Failure to properly schedule and perform required inspections can result in extended or additional maintenance, reducing system operating time and increasing system maintenance cost.

SUMMARY OF INVENTION

In one aspect, a method is provided for managing inspection requirements using a network-based system. The system includes a server system coupled to a centralized database and at least one client system. The method includes receiving information relating to components and storing the information into a centralized database. The method further includes cross-referencing the information received, updating the centralized database based on the information received and providing information in response to an inquiry.

In another aspect, a network-based system is provided for managing inspection requirements. The system includes a client system including a browser, a data storage device for storing information, and a server system configured to be coupled to the client system and the database. The server system is further configured to receive information relating to the inspection of components of a specific plant, store the information into a centralized database, and update the centralized database based on the information received. The server system is also configured to cross-reference the information received against the components and provide information In response to an inquiry.

In a further aspect, a computer program embodied on a computer readable medium is provided for managing inspection requirements. The program includes a code segment that receives information relating to components including inspection regulations. The program then maintains a database by adding, deleting and updating information relating to components and generates inspection requirements based on the information relating to components. The program further provides information to be displayed on a user system.

BRIEF DESCRIPTION OF DRAWINGS

FIG. 8 Is an exemplary embodiment of a user interface providing historical information to the user (Dresden 2 Plant).

FIG. 9 is an exemplary embodiment of a user interface of IMS displaying Next Required Exam data filters of a specific plant (Dresden 2 Plant).

FIG. 10 is an exemplary embodiment of a user interface of IMS displaying future inspection requirements data to the user (Dresden 2 Plant).

DETAILED DESCRIPTION

Figure 1:
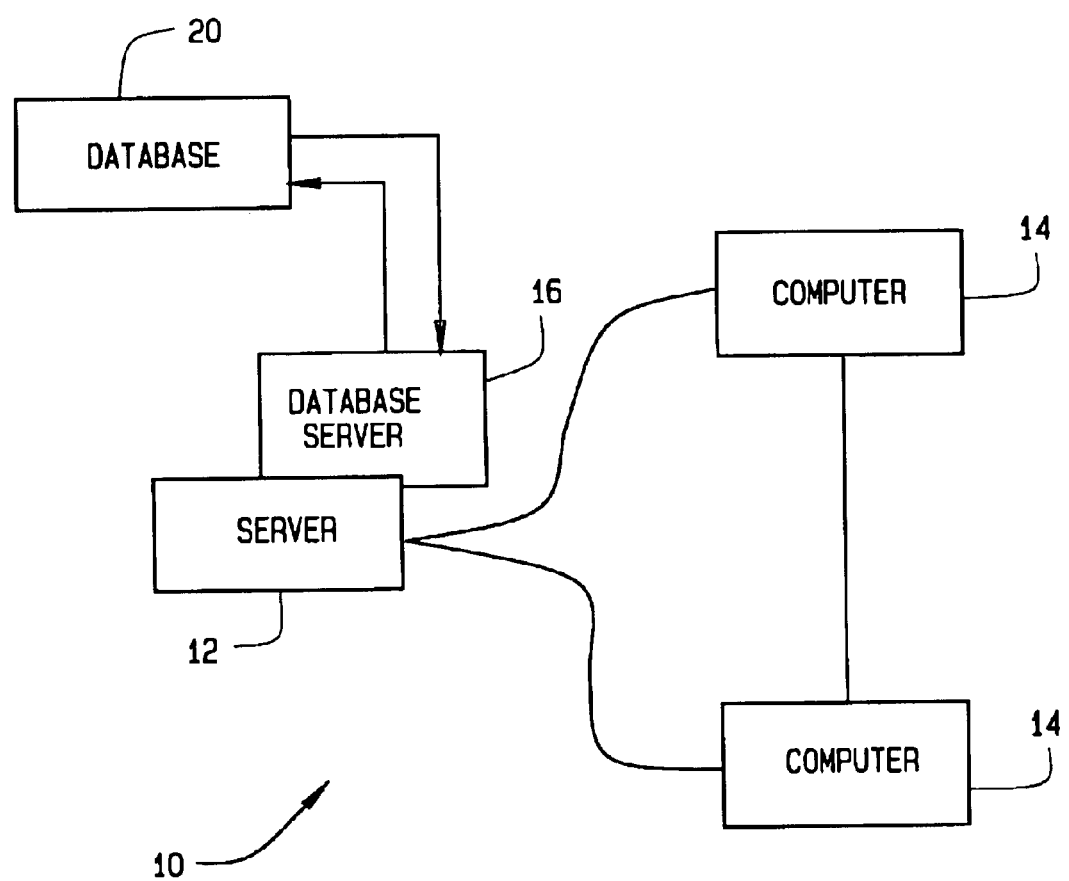
FIG. 1 is a simplified block diagram of an Inspection Management System (IMS) in accordance with one embodiment of the present invention.

Exemplary embodiments of systems and processes that facilitate integrated network-based electronic reporting and workflow process management related to an Inspection Management System (IMS) are described below in detail. The systems and processes facilitate, for example, electronic submission of information using a client system, automated extraction of information, and web-based assessment reporting for internal and external system users.

The IMS collects, tracks, schedules, and disseminates real time information regarding material inspections. In an exemplary embodiment, a searchable network-based IMS collects, tracks and disseminates real time information regarding material inspections of Boiling Water Reactor (BWR) components. In another embodiment, IMS collects, tracks, schedules and disseminates information regarding material inspections on other plants or systems including, but not limited to, Pressurized Water Reactor (PWR), Advanced Liquid Metal Reactor (ALMR), aircraft, ships or bridges.

Information relating to each component of a specific system or plant is received by IMS which stores the information into a centralized database, updates the centralized database based on the information received, cross-references the information received for the specific plant with the established regulations and provides information In response to an inquiry. The system provides a schedule of future inspection requirements sortable by date, component, criteria satisfaction, indication or any combination thereof. The system allows access to the most recent information, which was previously not possible. The system cross-references and updates the schedule of future inspections based on component inspection results and established regulations. The system also facilitates assessment of inspection requirement changes.

In the IMS, BWR Inspection information is stored in the centralized database. The network based IMS provides convenient access to reactor inspection information, including historical data and future required examination. The database is integrated into plant outage planning. Once into the plant's home page, the user has an option to access information on inspection components (IC) that have been inspected or requires inspection. IC include, but are not limited to, welds, joints, material interfaces, and stress points. In one embodiment IC welds include Control Rod Drive (CRD) Guide Tube body to sleeve welds, Core Plate Stiffener Beam to Core Plate Welds and other welds inside the reactor vessel.

In an exemplary embodiment, for each reactor IC, the following information can be accessed by a user:

Historical Data—This section is searchable using drill-down lists based on inspection date, exam type, component, inspection criteria result, and inspection indications. For a specific IC the IMS provides the identification, description, exam type, last inspection date, Inspection criteria result, and inspection indication.

Future Required Exam—This section is searchable using drill-down lists based on an inspection date range, component, inspection criteria result, and inspection indications. For a specific IC the IMS provides the identification, description, exam type, last Inspection date, inspection criteria result, inspection indication, inspection comments, next required exam, and the basis for the next required exam. The IMS cross-references and updates the next required exam based on component inspection results and established regulations.

The IMS provides a formalized process to meet and manage IC information pertaining to reactors and achieve full compliance with government regulatory inspection standards. The method utilizes a web application that facilitates management of preplanned shutdowns and the ability to effectively utilize emergent maintenance opportunities.

The systems and processes are not limited to the specific embodiments described herein. In addition, components of each system and each process can be practiced independent and separate from other components and processes described herein. Each component and process also can be used in combination with other components and processes.

The application is implemented utilizing a Structured Query Language (SQL) with a client user interface front-end for administration and a web interface for standard user input and reports. In an exemplary embodiment, the application is web enabled and is run on a business entity's intranet. In yet another embodiment, the application is fully accessed by individuals having an authorized access outside the firewall of the business entity through the Internet. In a further exemplary embodiment, the application is being run in a Windows NT environment. The application is flexible and designed to run In various different environments without compromising any major functionality.

FIG. 1 is a simplified block diagram of an Inspection Management System (IMS) 10 including a server sub-system, also referred to as server system 12, and a plurality of client sub-systems, also referred to as client systems 14, connected to server system 12. In one embodiment, client systems 14 are computers including a web browser, such that server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a centralized database 20 as described below in greater detail. In one embodiment, centralized database 20 is stored on server system 12 and can be accessed by potential users at one of client systems 14 by logging onto server system 12 through one of client systems 14. In an alternative embodiment centralized database 20 is stored remotely from server system 12.

Figure 2:
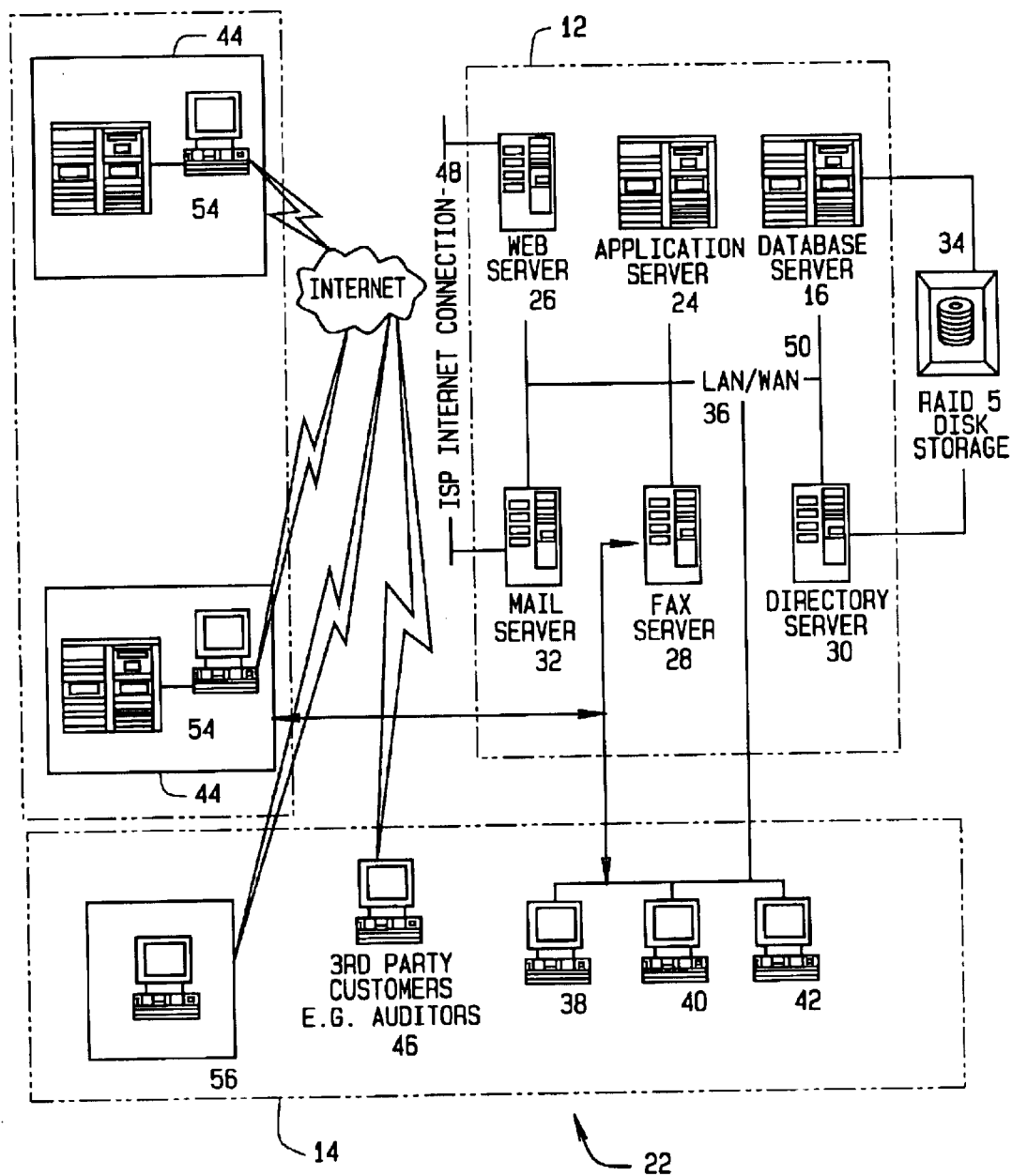
FIG. 2 is an expanded version block diagram of an exemplary embodiment of a server architecture of the IMS.

FIG. 2 is an expanded version block diagram of an exemplary embodiment of a server architecture of an Inspection Management System (IMS) 22. Components In system 22, identical to components of system 10 (shown in FIG. 1), are identified in FIG. 2 using the same reference numerals as used In FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 via an Internet link or are connected through an Intranet.

Each workstation, 38, 40, and 42 Is a personal computer having a web browser. Although the functions performed at the workstations typically are illustrated as being performed at respective workstations 38, 40, and 42, such functions can be performed at one of many personal computers coupled to LAN 36. Work stations 38, 40, and 42 are illustrated as being associated with separate functions only to facilitate an understanding of the different types of functions that can be performed by individuals having access to LAN 36.

In another embodiment, server system 12 is configured to be communicatively coupled to various individuals or employees 44 and to third parties, e.g., internal or external auditors 46, via an ISP Internet connection 48. The communication in the exemplary embodiment is Illustrated as being performed via the Internet, however, any other wide area network (WAN) type communication can be utilized in other embodiments, i.e., the systems and processes are not limited to being practiced via the Internet. In addition, and rather than WAN 50, local area network 36 could be used in place of WAN 50. In one specific exemplary embodiment, the following commercially available hardware and software are utilized: Web Server platform Windows NT 4.0 SP5; Database Server platform Windows NT 4.0; Internet Information Server (IIS) 4.0; Microsoft Transaction Server (MTS); COM objects using VB 6.0 dlls; Active Server Pages 3.0; Jscript 5.0; VBScript 5.0; and Database Oracle 8.0. The extranet site operates under IE 4.0 (or higher) and Netscape 4.0 (or higher).

In the exemplary embodiment, any authorized individual or an employee of the business entity having a workstation 54 can access the Inspection Management System (IMS). One of the client systems includes a senior manager's workstation 56 located at a remote location. Workstations 54 and 56 are personal computers having a web browser. Also, work stations 54 and 56 are configured to communicate with server system 12. In one embodiment, users access the customer dashboard application through a web site utilizing one of workstation 54 and 56. Workstations 54 and 56 include a network-browser, for example, Netscape® by Netscape Communications Corporation, or Internet Explorers® by Microsoft Corporation. In one embodiment, the network-browser is one of Internet Explorers® 4.0 (or higher), or Netscape Navigators® 4.0 (or higher). Furthermore, fax server 28 communicates with employees located outside the business entity's 44 and any of the remotely located client workstations, including a client workstation 56 via a telephone link. Fax server 28 is configured to communicate with other client workstations 38, 40, and 42 as well.

Figure 3:
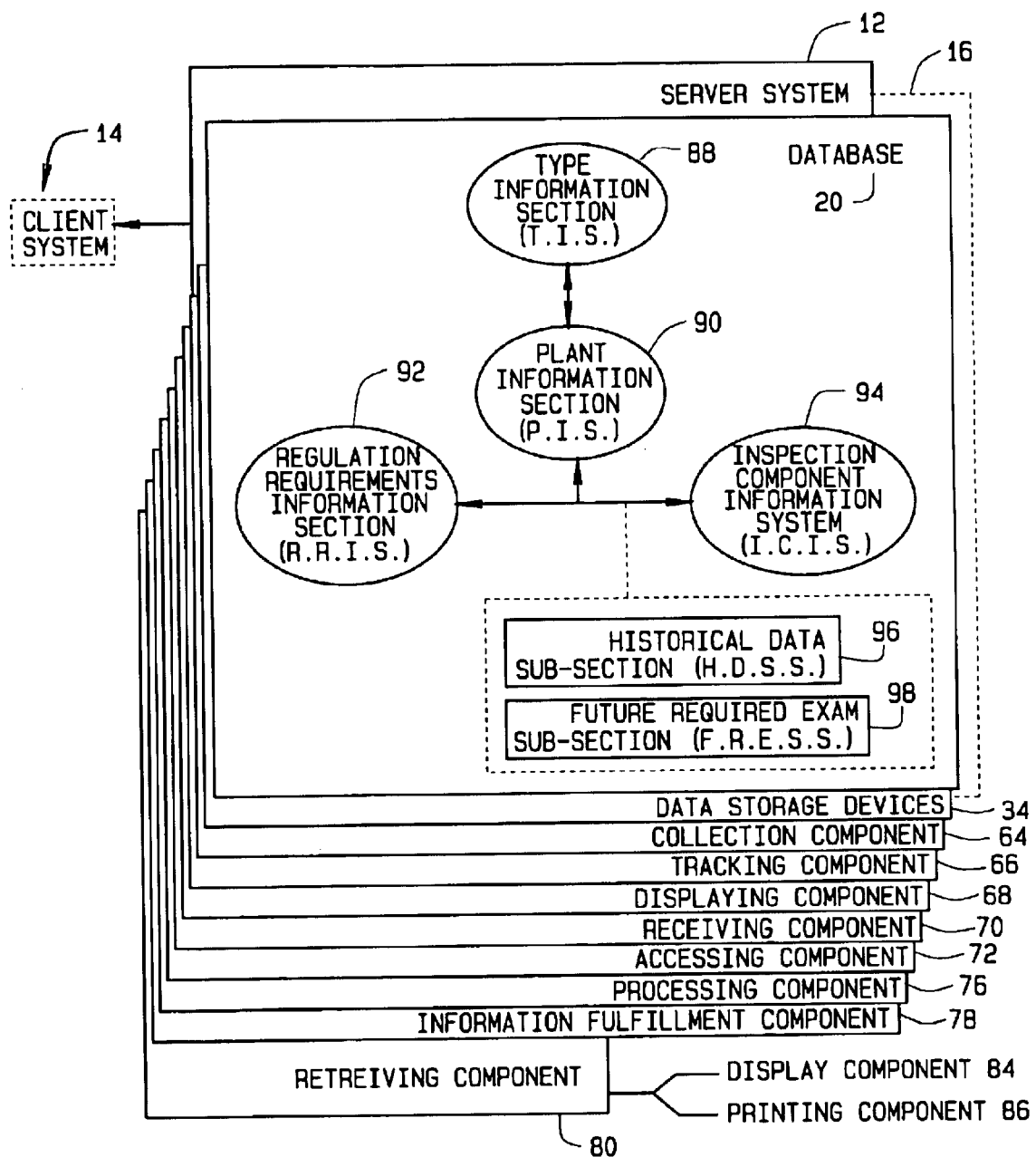
FIG. 3 shows a configuration of a database within the database server of the server system with other related server components.

FIG. 3 shows a configuration of database 20 within database server 16 of server system 12 shown in FIG. 1. Database 20 is coupled to several separate components within server system 12, which perform specific tasks.

Server system 12 Includes a collection component 64 for collecting information from users into centralized database 20, a tracking component 66 for tracking information, a displaying component 68 to display information, a receiving component 70 to receive a specific query from client system 14, and an accessing component 72 to access centralized database 20. Tracking component 66 updates database 20 when new information, such as component inspection results or changes to regulations, is received. Receiving component 70 is programmed for receiving a specific query from one of a plurality of users. Server system 12 further includes a processing component 76 for searching and processing received queries against data storage device 34 containing a variety of information collected by collection component 64. An Information fulfillment component 78, located in server system 12, downloads the requested information to the plurality of users in response to the requests received by receiving component 70. Information fulfillment component 78 downloads the information after the information is retrieved from data storage device 34 by a retrieving component 80. Retrieving component 80 retrieves, downloads and sends information to client system 14 based on a query received from client system 14 regarding various alternatives.

Retrieving component 80 further Includes a display component 84 configured to download information to be displayed on a client system's graphical user interface and a printing component 86 configured to print information. Retrieving component 80 generates various reports requested by the user through client system 14 in a predetermined format. System 10 is flexible to provide other alternative types of reports and is not constrained to the options set forth above.

Database 20 is divided Into a Type Information Section (TIS) 88, Plant Information Section (PIS) 90, Regulation Requirements Information Section (RRIS) 92, IC Information Section (ICIS) 94, and several sub-sections underlying each IC. TIS 88 contains Information about various system types including, but not limited to, BWR, PWR, and ALMR.

In another embodiment, TIS 88 contains information relevant to passenger aircraft, transportation aircraft, and military aircraft. PIS 90 contains information specific to each plant. In one embodiment, PIS contains information relevant to various plants, including, but not limited to: Dresden 2 plant, Dresden 3 plant, LaSalle 1 plant, LaSalle 2 plant, Quad Cities 1 plant, and Quad Cities 2 plant, Clinton plant, Peach Bottom 2 plant, Peach Bottom 1 plant, Limerick 1 plant, Limerick 2 plant, and Oyster Creek plant.

RRIS 92 contains Information regarding regulations set forth by various controlling authorities pertaining to inspection periodicity and specifications. RRIS 92 also contains Information regarding recommendations from various authorities, including regulators, manufacturers, and servicing entities, pertaining to inspection periodicity and specifications. RRIS 92 further contains Information regarding fleet inspection results data, particularly in regard to fleet inspection results data modifying inspection regulations or recommendations.

IC are the principle components that are used In the system. IC can vary from plant to plant. The IC classified in the Dresden 2 BWR may be different than the IC in Oyster Creek BWR. In one of an exemplary embodiment of the Inventions, IC classified for the Dresden 2 BWR Include: Core Spray, CP Stiffener Beams, Control Rod Drive Housing, Control Rod Guide Tubes, Pipe Bracket, Core Spray Sparger, Feed Water Sparger, Incore Housing, Incore Guide Tube, SRM/IRM, Jet Pump, Moisture Separator, RPV Interior, Shroud, CDR Stub Tube, Steam Dryer, TG Align Pin. Classified IC can be further divided into subcomponent groups. ICIS 94 includes information relevant to each component including, but not limited to, location, description, subcomponents, fleet experience regarding inspection failure and working life, and structure.

Several sub-sections underlie each IC. A Historical Data Sub-Section (HDSS) 96 includes data relating to last inspection date, Identification number, description, exam type, inspection criteria result, and inspection indication. HDSS 96 also Includes fleet inspection results data relative to each component.

A Future Required Exam Sub-Section (FRESS) 98 Includes information relating to Inspection due date, identification, description, exam type, last Inspection date, inspection criteria result, and inspection indication. TIS 88, PIS 90, RRIS 92, ICIS 94, HDSS 96 and FRESS 98 within database 20 are interconnected to update and retrieve information as required. FRESS 98 is updated by IMS 10 based on component inspection results and regulations.

System 10 accumulates a variety of confidential data. Therefore, system 10 has different access levels to control and monitor the security of the system. Authorization for access is assigned by system administrators on a need to know basis. In an alternative embodiment, system 10 provides access based on job functions. In yet another embodiment of the invention, system 10 provides access based on positions and management authority within the business entity. The administration/editing capabilities within system 10 are also restricted to ensure that only authorized individuals have access to modify or edit the information that is already existing in the system. These internal controls with reference to system security help system 10 to manage and control the access to the information.

The architectures of system 10 as well as various components of system 10 are exemplary only. Other architectures are possible and can be utilized in connection with practicing the processes described below.

Figure 4:
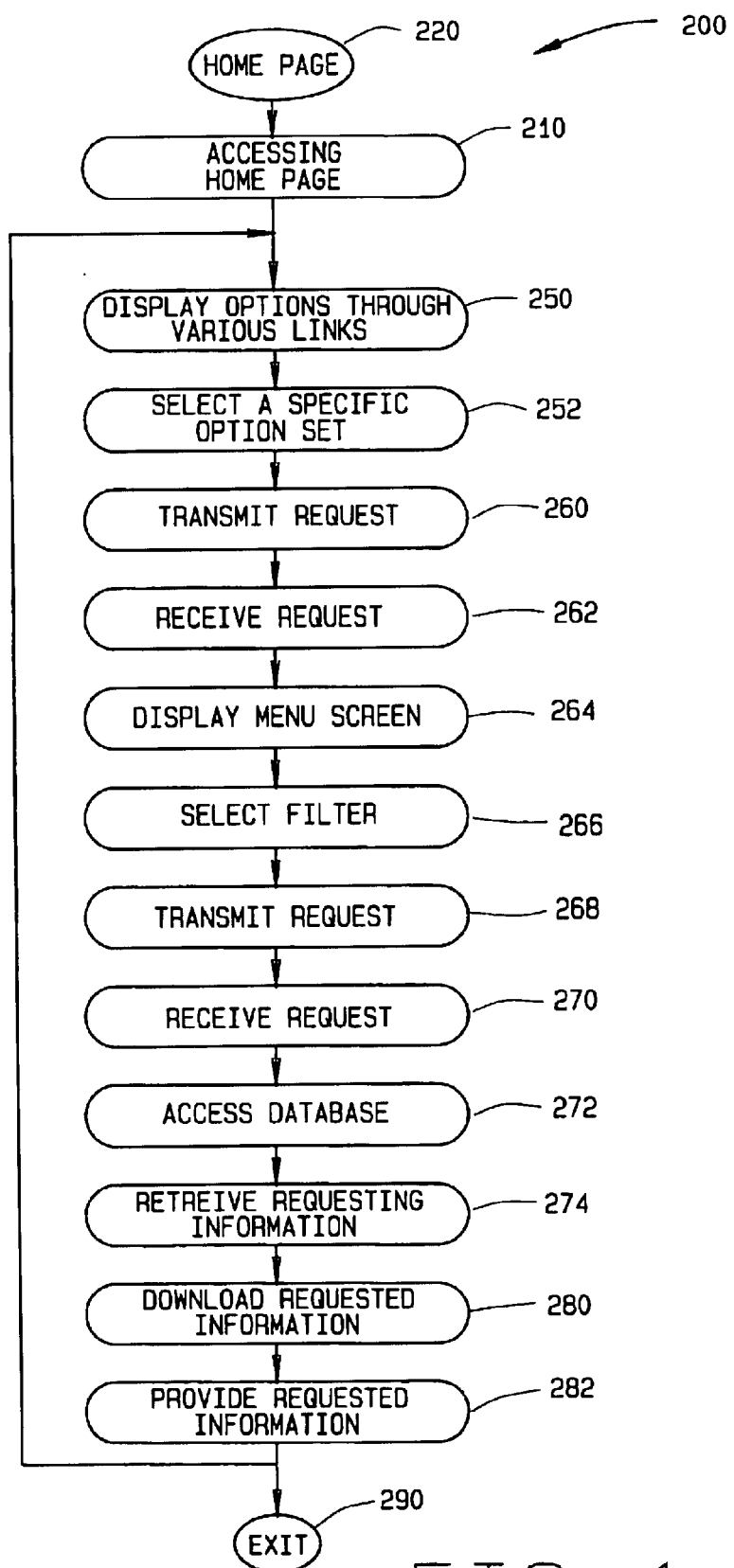
FIG. 4 is an flowchart of the processes used by IMS to facilitate use.

FIG. 4 is a flowchart 200 of the processes used by system 10 to facilitate use. Initially, the user accesses 210 a user interface 220 of the web site through client system 14 (shown in FIG. 1). In one embodiment, client system 14, as well as server system 12, are protected from access by unauthorized individuals. The user can be required to log-in to system 10 using a password (not shown) or an employee payroll number for security. User interface 220 displays several options 250 available to the user through various links. Once the user selects 252 a specific plant and information option set (historical or future) from the various links, the request is transmitted to server system 12. Transmitting the request 260 is accomplished either by click of a mouse or by a voice command. Once server system 12 (shown in FIG. 1) receives 262 the request, server system 12 displays 264 the filter pull-down lists to the user relating to the plant and information option selected. The user selects 266 the desired filters and transmits the request 268. Server system 12 receives the request 270 and accesses 272 database server 16 to retrieve requested information 274 from database 20 (shown in FIG. 1). The requested information is downloaded 280 and provided 282 to client system 14 from server 12. The user continues to search database 20 for other information or exits 290 from IMS 10.

Figures 5, 6:
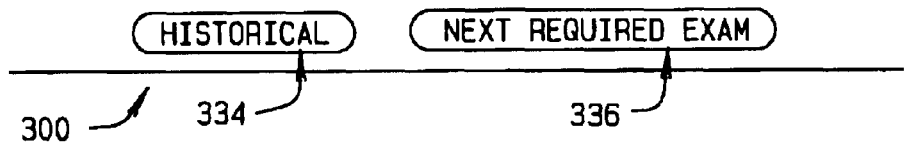
FIG. 5 is an exemplary embodiment of a user interface displaying a home page.
FIG. 6 is an exemplary embodiment of a user interface displaying Historical Exam data filters of a specific plant (Dresden 2 Plant).

FIG. 5 is an exemplary embodiment of a user interface 300 displaying a home page of Inspection Management System (IMS) 10 (shown in FIG. 2). In one exemplary embodiment, user interface 300 displays different alternative plants to a user through various links. These linkages include a link to Dresden 2 plant 310, a link to Dresden 3 plant 312, a link to LaSalle 1 plant 314, a link to LaSalle 2 plant 316, a link to Quad Cities 1 plant 318, a link to Quad Cities 2 plant 320, a link to Clinton plant 322, a link to Peach Bottom 2 plant 324, a link to Peach Bottom 3 plant 326, a link to Limerick 1 plant 328, a link to Limerick 2 plant 330, and a link to Oyster Creek plant 332. User interface 300, also known as an Inspection Management System's home page, is linked to database 20. Database 20 is often referred to as the Inspection management database or the database. Home Page 300 is the entry point for anyone trying to access Inspection Management Database 20 via the web. The first step in accessing information is to select an option listed on Home Page 300 and to indicate that selection by clicking the selected link. Additionally, Home Page 300 facilitates the selection of Historical Data or Future Required Exam data. A "Historical" button 334 and a "Next Required Exam" button 336 are provided. Selection of the desired button 334 or 336 after selection of the desired plant system 10 downloads and provides the next interface.

FIG. 6 are exemplary embodiments of a user interface 340 of Inspection Management System (IMS) 10 displaying Historical Exam data filters of a specific plant. In an exemplary embodiment of the invention, user interface 340 is displayed on the client system 14 once the user has selected a link to Dresden 2 plant 310 and selected Historical button 334 (shown in FIG. 5). In one embodiment, as a user aid, interface 340 displays the name of the selected plant 342 and the date 344. User interface 340 facilitates filtering and selecting Historical Exam data for Dresden 2 plant. User Interface 340 provides user selectable options or filters 346 from pull-down lists to filter the historical inspection data. In a specific embodiment of the invention, Last Inspection Range initial month 350, initial year 352, final month 354 and final year 356, Exam Type 360, Components 362, Criteria Met 364 and Indications 366 options or pull-down lists are provided. Each pull-down list 350, 352, 354, 356, 360, 362, 364, and 366 is utilized by selection of the down arrow in the display field, and clicking on desired item. Use of pull-down list 350, 352, 354, 356, 360, 362, 364, and 366 facilitates filtering the historical inspection data. Exam types pull-down list can include, but is not limited to: all, ultrasonic testing, enhanced visual testing, visual testing, and eddy current testing. In one embodiment, Criteria Met pull-down list includes all, yes, and no. Indications pull-down list also includes all, yes, and no.

User Interface 340 also provides an "OK" button 420 and a "Back" button 422. Once the user has selected the desired filters and selects "OK" button 420, system 10 downloads and displays relevant historical information. Selection of "Back" button 422 displays the prior user interface.

Figure 7:
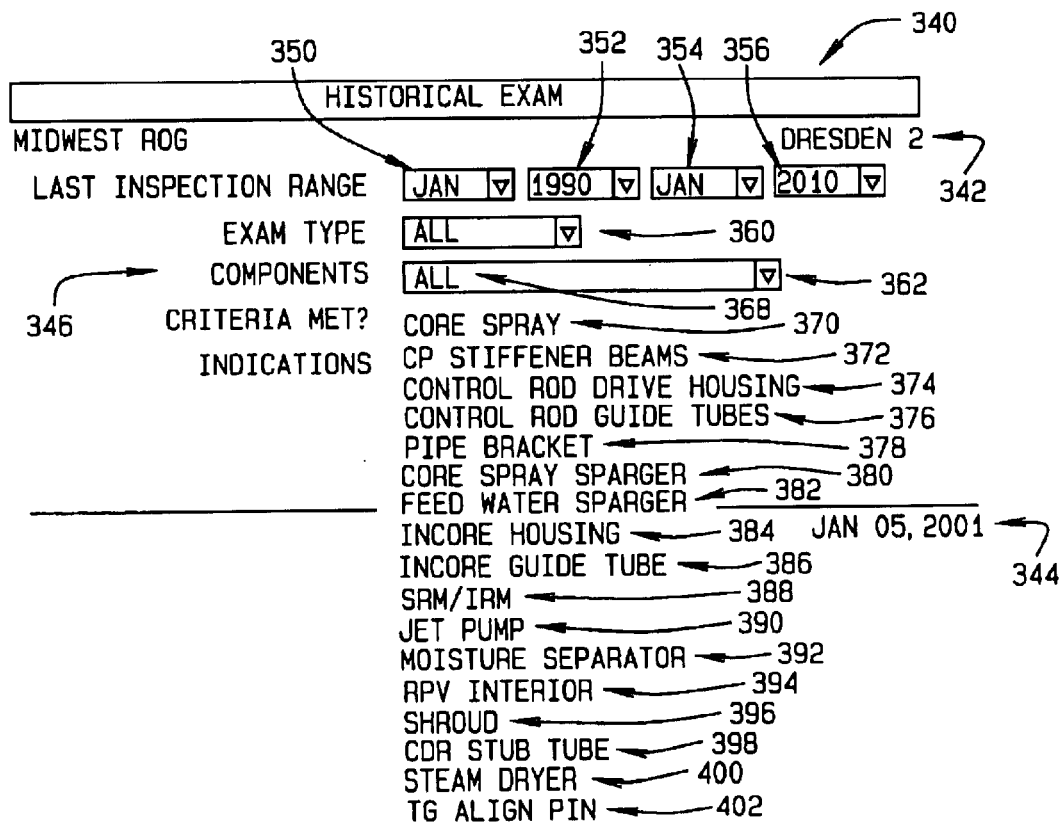
FIG. 7 is an exemplary embodiment of a user interface displaying components data filters of a specific plant (Dresden 2 Plant).

FIG. 7 is an exemplary embodiment of a user interface displaying components data filters of a specific plant (Dresden 2 Plant). In a specific embodiment of the invention, Components options or pull-down list 362 for the Dresden 2 plant includes: All 368, Core Spray 370, CP Stiffener Beams 372, Control Rod Drive Housing 374, Control Rod Guide Tubes 376, Pipe Bracket 378, Core Spray Sparger 380, Feed Water Sparger 382, Incore Housing 284, Incore Guide Tube 386, SRM/IRM 388, Jet Pump 390, Moisture Separator 392, RPV Interior 394, Shroud 396, CDR Stub Tube 398, Steam Dryer 400, TG Align Pin 402.

FIG. 8 is an exemplary embodiment of a user interface 500 providing historical information to the user. In one embodiment of the Invention, user interface 500 is displayed on the client system 14 once the user has selected a set of filters (shown in FIG. 6) relating to Dresden 2 plant. In an exemplary embodiment of the invention, user interface 500 displays information for CR Guide Tubes 376. System 10 downloads and user interface 500 displays the component name 502 and historical information relevant to that component, including: a Weld Identification 510, a Weld Description 512, an Exam Type 514, a Last Inspection date 516, a Criteria Met information 518, an Indications information 520, and a Comments field 522. In an exemplary embodiment of the invention, system 10 displays a pop-up box 524 with additional information when the user selects a specific Comment field 522. In one embodiment, each specific Comment field 522 is an active link that can be selected by placing the pointer or mouse cursor on the desired Comment field 522. A Back button (not shown) is available to return the user back to the prior user interface, to facilitate review of additional historical data. A link (not shown) is also available to return the user to user interface 300.

FIG. 9 is an exemplary embodiment of a user interface 600 of Inspection Management System (IMS) 10 displaying Next Required Exam data filters of a specific plant. User interface 600 is accessed from user interface 300. In an exemplary embodiment of the invention, user interface 600 is displayed on the client system 14 once the user has selected a link to Dresden 2 plant and selected the Next Required Exam button 336 (shown in FIG. 5). In one embodiment, as a user aid, user interface 600 displays the name of the selected plant 602 and the date 604. User interface 600 facilitates filtering and selecting Next Required Exam data for Dresden 2 plant. User interface 600 provides user selectable filters 606 from pull-down list to filter future Inspection requirements data. In a specific embodiment of the invention, Next Inspection Range initial month 610, Initial year 612, final month 614 and final year 616, Components 620, Criteria Met 622 and Indications 624 pull-down lists are provided. Each pull-down list 610, 612, 614, 616, 620, 622, and 624 is utilized by selection of the down arrow in the display field, and clicking on the desired item. Use of pull-down list 610, 612, 614, 616, 620, 622, and 624 facilitates filtering the future inspection requirements data. In a specific embodiment of the invention, Components pull-down list 620 for the Dresden 2 plant includes: All 628, Core Spray 630, CP Stiffener Beams 632, Control Rod Drive Housing 634, Control Rod Guide Tubes 636, Pipe Bracket 638, Core Spray Sparger 640, Feed Water Sparger 642, incore Housing 644, Incore Guide Tube 646, SRM/IRM 648, Jet Pump 650, Moisture Separator 652, RPV Interior 654, Shroud 656, CDR Stub Tube 658, Steam Dryer 660, TG Align Pin 662. In one embodiment, Criteria Met pull-down list includes yes and no. Indications pull-down list also includes yes and no.

FIG. 10 is an exemplary embodiment of a user interface 700 displaying future inspection requirements data to the user. In one embodiment of the invention, user interface 700 is displayed on the client system 14 once the user has selected a set of filters (shown in FIG. 9) relating to Dresden 2 plant. In an exemplary embodiment of the invention, user interface 700 displays information for Core Spray 630. User interface 700 displays component name 702 and information relevant to future required examinations of the component, including: a Weld Identification 710, a Weld Description 712, an Exam Type 714, a Last Inspection date 716, a Criteria Met? information 718, an indications information 720, a Next Required Exam information 722, and a Basis field 724. In an exemplary embodiment of the invention, system 10 displays a pop-up box 726 with additional information when the user selects a specific Basis field 724. Basis field 724 provides information relevant to the controlling regulation for determining the inspection requirement periodicity of the selected weld based on existing criteria and indications. In one embodiment, each specific Basis field 724 is an active link that can be selected by placing the pointer or mouse cursor on the desired Basis field 724. A Back button (not shown) is available to return the user back to the prior user interface, to facilitate review of additional historical data. A link (not shown) is also available to return the user to user interface As described, IMS 10 includes a searchable database 20 for all information related to various plants and their components which provides flexibility to manage shutdown periods and inspections and safety related information. IMS 10 reduces paper-based information by providing on-line up-to-date current information, which is essential in day-to-day management of the regulated industries.

In addition, IMS 10 provides electronic customer notification flexibility (not shown) that includes notification of events affecting inspection including, but not limited to, updated inspection guidelines, new or revised industry component findings, manufacturer's Safety Information Letters (SILs), and inspection results. This notification may be in the form of an e-mail that is automatically generated to the customer, or a note on a Customer Web Center. Additionally, notifications can be generated by system 10 based on time until an inspection is due. Although IMS is launched as a stand-alone application, in an alternative embodiment of the invention, IMS Resides Under the Customer Web Center.

IMS provide multiple users with access to a single information source including all plant inspection history and regulations. IMS allows the user to track and evaluate inspection findings and future requirements. IMS facilitates user's ability to plan outage or downtime schedules and to rapidly take advantage of any unplanned shutdown periods. IMS provides valuable services to the customer as well as service personnel who are involved in supporting a plant.

while the invention has been described in terms of various specific embodiments, those skilled in the art will recognize that the invention can be practiced with modification within the spirit and scope of the claims.

What is claimed is:

1. A method for managing inspection requirements using a network-based system including a server system coupled to a centralized database and at least one client system, said method comprising:

receiving information relating to components in a plant, including weld inspection information;

storing the information into the centralized database;

cross-referencing the information received;

updating the centralized database based on the information received;

modifying inspection requirements based on inspection result information;

determining next required inspection of each plant component based on inspection result information and regulatory requirements;

developing a schedule of future inspection requirements sortable by inspection date, component, inspection criteria satisfaction, and defect indication;

notifying a user of events affecting the inspection schedule, including at least one of updated inspection guidelines, revised industry component findings, component manufacturer safety information alerts, and inspection results; and providing information in response to an inquiry including information relating to component identification, component description, inspection type, last inspection date, inspection criteria result, defect indication, inspection comments, next required inspection, and a basis for the next required inspection.

2. A method in accordance with claim 1 wherein receiving information comprises receiving data relevant to at least one of inspection regulations, inspection recommendations, and fleet experience with the components.

3. A method in accordance with claim 1 wherein receiving information comprises the receiving data for at least one of a Boiling Water Reactor Plant, Pressurized Water Reactor Plant, and an Advanced Liquid Metal Reactor Plant.

4. A method in accordance with claim 1 wherein receiving information comprises receiving data for at least one of a Core Spray, CP Stiffener Beams, a Control Rod Drive Housing, Control Rod Guide Tubes, a Pipe Bracket, a Core Spray Sparger, a FW Sparger, a Incore Housing, a Incore Guide Tube, a SRM/IRM, a Jet Pump, a Moisture Separator, a RPV Interior, a Shroud, a CDR Stub Tube, a Steam Dryer, and a TG Align Pin.

5. A method in accordance with claim 1 wherein receiving information comprises the receiving data for at least one of a plurality of plants.

6. A method in accordance with claim 1 wherein storing data comprises storing data including at least one of component location, component description, and component inspection history.

7. A method in accordance with claim 1 wherein storing the information comprises storing examination information for at least one of ultrasonic testing, enhanced visual testing, visual testing, and eddy current testing.

8. A method in accordance with claim 1 wherein cross-referencing the information comprises correlating at least one of inspection regulations, inspection recommendations, and fleet inspection results data to the components of specific plants.

9. A method in accordance with claim 1 wherein cross-referencing the information comprises correlating inspection regulations to inspection results.

10. A method in accordance with claim 1 wherein providing information in response to an inquiry comprises:
   downloading requested information from the server system; and
   displaying requested information on the client system in response to the inquiry.

11. A method in accordance with claim 1 wherein providing information comprises:
   displaying information on the client system identifying at least one of an option relating to at least one of a plurality of plants; and
   receiving an inquiry from the client system regarding at least one of an option relating to at least one of a plurality of plants.

12. A method in accordance with claim 1 wherein providing information comprises:
   displaying information on the client system identifying at least one of an option relating to a Core Spray, CP Stiffener Beams, a Control Rod Drive Housing, Control Rod Guide Tubes, a Pipe Bracket, a Core Spray Sparger, a FW Sparger, a Incore Housing, a Incore Guide Tube, a SRM/IRM, a Jet Pump, a Moisture Separator, a RPV Interior, a Shroud, a CDR Stub Tube, a Steam Dryer, and a TG Align Pin; and
   receiving an inquiry from the client system regarding at least one of an option relating to a Core Spray, CP Stiffener Beams, a Control Rod Drive Housing, Control Rod Guide Tubes, a Pipe Bracket, a Core Spray Sparger, a FW Sparger, a Incore Housing, a Incore Guide Tube, a SRM/(IRM, a Jet Pump, a Moisture Separator, a RPV Interior, a Shroud, a CDR Stub Tube, a Steam Dryer, and a TG Align Pin.

13. A method in accordance with claim 1 wherein providing information comprises:
   accessing the centralized database;
   searching the database regarding the specific inquiry;
   retrieving information from the database; and
   transmitting the retrieved information to the client system for display by the client system.

14. A method in accordance with claim 1 wherein providing information includes providing at least one of historical inspection data and future inspection requirements.

15. A method in accordance with claim 1 wherein providing information includes providing future inspection requirements for at least one of a specified time range and a specified component.

16. The method in accordance with claim 1 wherein the client system and the server system are connected via a network and wherein the network is one of a wide area network, a local area network, an intranet and the Internet.

17. A network-based system for managing inspection requirements, said system comprising:
   a client system comprising a browser;
   a data storage device for storing information;
   a server system configured to be coupled to said client system and said data storage device said server system further configured to:
   receive information relating to inspection of components of a specific plant;
   store the information into a centralized database;
   update the centralized database based on the information received;
   modify inspection requirements based upon inspection result information;
   determine next required inspection of each plant component based on the inspection result information and regulatory requirements;
   cross-reference the information received against the components;
   provide a schedule of future inspection requirements sortable by inspection date, component, inspection criteria satisfaction, and defect indication;
   notify a user of events affecting the inspection schedule, including at least one of undated inspection guidelines, revised industry component findings, component manufacturer safety information alerts, and inspection results; and
   provide information in response to an inquiry including information relating to component identification, component description, inspection type, last inspection date, inspection criteria result, defect indication, inspection comments, next required inspection, and a basis for the next required inspection.

18. A network-based system in accordance with claim 17 further configured to be protected from access by unauthorized individuals.

19. A network-based system in accordance with claim 17 wherein said server system further configured with a processing component for searching and processing received inquiries against the data storage device containing information collected by a collection component.

20. A network-based system in accordance with claim 17 wherein said server system further configured with a processing component for cross-referencing inspection regulations and component information.

21. A network-based system in accordance with claim 17 wherein said server system further configured with a retrieving component to retrieve information from the data storage device.

22. A network-based system in accordance with claim 17 wherein said server system further configured to store data relevant to at least one of fleet inspection results, inspection requirements, inspection recommendations, criteria information, and indication information.

23. A network-based system in accordance with claim 17 wherein said server system further configured to add and delete information.

24. A network-based system in accordance with claim 17 wherein said server system further configured to enter information on-line.

25. A network-based system in accordance with claim 17 wherein said server system configured to provide information in response to an inquiry further configured to:
   download requested information from a server system; and
   display requested information on a client system in response to the inquiry.

26. A network-based system in accordance with claim 17 wherein said server system further configured to submit a request through pull-down lists.

27. A computer program embodied on a computer readable medium for managing inspection requirements, said program comprising:
   a code segment that receives information relating to components including inspection regulations and inspection results;

a code segment that maintains a database by adding, deleting and updating information relating to components;

a code segment that generates inspection requirements based on the information relating to components;

a code segment that determines next required inspection of each plant component based on inspection results information and regulatory requirements;

a code segment that provides a schedule of future inspection requirements sortable by inspection date, component, inspection criteria satisfaction, and defect indication;

a code segment that notifies a user of events affecting the inspection schedule, including at least one of updated inspection guidelines, revised industry component findings, component manufacturer safety information alerts, and inspection results; and a code segment that provides information to be displayed on a user system including information relating to component identification, component description, inspection type, last inspection date, inspection criteria result, defect indication, inspection comments, next required inspection, and a basis for the next required inspection.

28. A computer program in accordance with claim 27 further comprising a code segment configured to provide information to determine inspection requirements for a specific component in accordance with inspection regulations.

29. A computer program in accordance with claim 28 further comprising a code segment that provides at least one of an option to filter inspection requirements based on at least one of a time range, a component, an indication and a criteria.

30. A computer program in accordance with claim 28 further comprising:

a code segment that accesses the database;

a code segment that searches the database regarding the specific inquiry;

a code segment that retrieves information from the database; and a code segment that causes the retrieved information to be displayed on the system.

* * * * *

UNITED STATES PATENT AND TRADEMARK OFFICE
CERTIFICATE OF CORRECTION

PATENT NO. : 6,772,098 B1
DATED : August 3, 2004
INVENTOR(S) : Stark et al.

It is certified that error appears in the above-identified patent and that said Letters Patent is hereby corrected as shown below:

Column 11,
Line 37, delete "SRM/(IRM" and insert therefor -- SRM/IRM --.

Column 14,
Line 21, between "the" and "system" insert -- user --.

Signed and Sealed this

Tenth Day of May, 2005

JON W. DUDAS
*Director of the United States Patent and Trademark Office*